United States Patent
Hsieh

(10) Patent No.: US 11,105,745 B2
(45) Date of Patent: Aug. 31, 2021

(54) BIOSENSOR

(71) Applicant: VisEra Technologies Company Limited, Hsin-Chu (TW)

(72) Inventor: Hsin-Yi Hsieh, Taoyuan (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 16/597,986

(22) Filed: Oct. 10, 2019

(65) Prior Publication Data

US 2021/0109021 A1 Apr. 15, 2021

(51) Int. Cl.
*G01N 21/64* (2006.01)

(52) U.S. Cl.
CPC ....... *G01N 21/645* (2013.01); *G01N 21/6486* (2013.01); *G01N 2021/6471* (2013.01); *G01N 2021/6482* (2013.01); *G01N 2201/0636* (2013.01)

(58) Field of Classification Search
CPC ............ G01N 21/645; G01N 21/6486; G01N 2021/6471; G01N 2021/6482; G01N 2201/0636
See application file for complete search history.

(56) References Cited

U.S. PATENT DOCUMENTS

| | | | |
|---|---|---|---|
| 6,287,871 B1 | 9/2001 | Herron et al. | |
| 9,778,191 B2 | 10/2017 | Hsieh et al. | |
| 9,915,612 B2 | 3/2018 | Grot et al. | |
| 9,990,381 B2 | 6/2018 | Eltoukhy et al. | |
| 10,048,208 B2 | 8/2018 | Rothberg et al. | |
| 10,254,225 B2 | 4/2019 | Zhong et al. | |
| 2005/0112548 A1* | 5/2005 | Segawa ................ | G01N 21/645 435/4 |
| 2005/0157301 A1* | 7/2005 | Chediak ............ | G01N 21/6454 356/417 |
| 2005/0237524 A1 | 10/2005 | Kamei et al. | |
| 2010/0065726 A1 | 3/2010 | Zhong et al. | |
| 2010/0204064 A1* | 8/2010 | Cho .................... | G01N 21/6454 506/17 |
| 2013/0208371 A1 | 8/2013 | Lin et al. | |
| 2014/0295577 A1 | 10/2014 | Matsuzawa et al. | |
| 2018/0155782 A1* | 6/2018 | Zhong ................ | H01L 27/1464 |

(Continued)

FOREIGN PATENT DOCUMENTS

| CN | 101995397 A | 3/2011 |
|---|---|---|
| CN | 103299166 B | 9/2015 |

(Continued)

OTHER PUBLICATIONS

Taiwan Office Action cited in counterpart application No. TW109110970 dated Dec. 4, 2020, 6 pages.

*Primary Examiner* — Marcus H Taningco
(74) *Attorney, Agent, or Firm* — Muncy, Geissler, Olds & Lowe, P.C.

(57) ABSTRACT

In some embodiments, a biosensor is provided. The biosensor includes a sensing element and a cover disposed on the sensing element. The sensing element includes: a first substrate embedded with a photodiode; and a filter layer disposed on the substrate. The cover includes: a second substrate; an upper optical element disposed in the second substrate; and an upper reaction well disposed on the upper optical element.

21 Claims, 13 Drawing Sheets

(56) References Cited

U.S. PATENT DOCUMENTS

| | | | |
|---|---|---|---|
| 2018/0180547 A1 | 6/2018 | Cao et al. | |
| 2019/0198553 A1* | 6/2019 | Cai | H01L 27/14609 |
| 2019/0204226 A1* | 7/2019 | Fung | G02B 5/223 |
| 2019/0212265 A1 | 7/2019 | Rothberg et al. | |
| 2019/0212266 A1* | 7/2019 | Baker | G02B 21/16 |

FOREIGN PATENT DOCUMENTS

| | | |
|---|---|---|
| CN | 105980580 A | 9/2016 |
| TW | 201930851 A | 8/2019 |
| WO | WO01/03833 A1 | 1/2001 |
| WO | WO-2013/171197 A1 | 11/2013 |
| WO | WO2019/013166 A1 | 1/2019 |

\* cited by examiner

BIOSENSOR

BACKGROUND OF THE INVENTION

Field of the Invention

The present invention relates to a biosensor, and in particular, it relates to a biosensor with a focusing element or a focusing structure.

Description of the Related Art

Recently, CMOS image sensors have been used for biological or biochemical detection. For such an application, a fluorescent molecule may serve as a reporter and label on a biological or biochemical sample. The biological or biochemical sample may be placed on a photodiode, and fluorescent light emitted by the biological or biochemical sample may be directed to the photodiode for the decoding of bio signals based on the predetermined working process or algorithm. The fluorescence signal usually needs a shorter wavelength of excitation light to generate a longer wavelength of emission light signal. Therefore, an appropriate optical element may be essential to block the shorter wavelength of excitation light entering the photodiode for the identification of weak emission light signals with a longer wavelength. Although existing CMOS image sensors have been adequate for their intended purposes, they have not been entirely satisfactory in all respects. For example, reaction wells are only formed in the sensing element, and one reaction well usually corresponds to at least one sensing pixel. Therefore, the throughput of existing biosensors cannot satisfy current needs. In addition, some devices may include light condensing elements, such as Fresnel lenses, microlenses and bright enhancement films (BEF), to focus emission light onto the sensing element for the signal enhancement. However, Fresnel lenses, microlenses and bright enhancement films (BEF) are not spectrum-selective enough to only collect emission light and therefore also increase the noise intensity from excitation light.

As a result, a novel biosensor which has a higher throughput and a spectrum-selective focusing element is needed.

BRIEF SUMMARY OF THE INVENTION

In some embodiments of the present disclosure, a biosensor is provided. The biosensor includes a sensing element and a cover disposed on the sensing element. The sensing element includes: a first substrate embedded with a photodiode; and a filter layer disposed on the substrate. The cover includes: a second substrate; an upper optical element disposed in the second substrate; and an upper reaction well disposed on the upper optical element.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
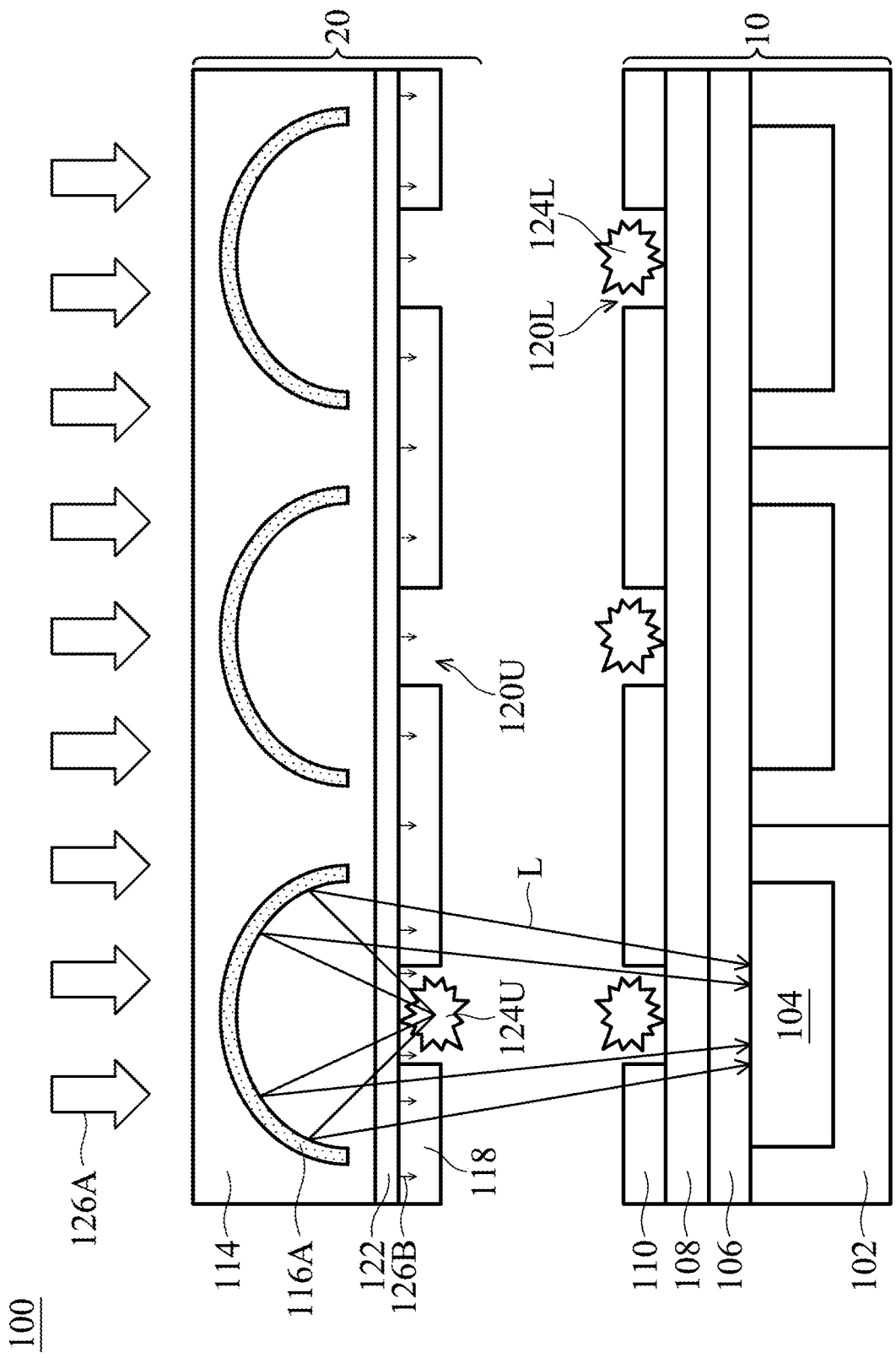
FIG. 1 illustrates a cross-sectional view of a biosensor according to some embodiments of the present disclosure.

The biosensor of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed as referring to the orientation as described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

The embodiments of the present disclosure provide biosensors which include a focusing element or a focusing structure in the cover. As a result, reaction wells can also be designed in the cover, thereby increasing the throughput.

FIG. 1 illustrates a cross-sectional view of a biosensor 100 according to some embodiments of the present disclosure. Referring to FIG. 1, the biosensor 100 includes a sensing element 10 and a cover 20.

The sensing element 10 essentially includes a substrate 102, a photodiode 104, a filter layer 106, a passivation layer 108, and a modification layer 110.

The substrate 102 is embedded with the photodiode 104. In some embodiments of the present disclosure, the substrate 102 is a bulk semiconductor substrate, such as a semiconductor wafer. For example, the substrate 102 is a silicon wafer. The substrate 102 may include silicon or another elementary semiconductor material such as germanium. In some other embodiments, the substrate 102 includes a compound semiconductor. The compound semiconductor may include gallium arsenide, silicon carbide, indium arsenide, indium phosphide, another suitable material, or a combination thereof, but is not limited thereto.

In some embodiments, the substrate 102 includes a semiconductor-on-insulator (SOI) substrate. The SOI substrate may be fabricated using a separation by implantation of oxygen (SIMOX) process, a wafer bonding process, another applicable method, or a combination thereof, but is not limited thereto. In some embodiments, the substrate 102 is an un-doped substrate.

The filter layer 106 is disposed on the substrate 102. The filter layer 106 may be formed by using sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), physical vapor deposition process, molecular beam deposition process, any other suitable process or a combination thereof, but is not limited thereto. The filter layer 106 may be an organic color filter or an inorganic color filter, including a pigment-based polymer, a pigment-based dye, a dye-based polymer, a resin-based material, a dielectric interference filter, a plasmonic metasurface structure, or a dielectric metasurface structure. The filter layer 106 may exclude the light in a specific wavelength range from passing through it and/or allow the light in another specific wavelength range to pass through it. In some embodiments, the filter layer may be made of a red color filter, a green color filter, a blue color filter, a cyan color filter, a magenta color filter, a yellow color filter, or an infrared (IR) pass filter according to needs, but the present disclosure is not limited thereto.

The passivation layer 108 is disposed on the filter layer 106. The passivation layer 108 may be formed by using sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), physical vapor deposition process, molecular beam deposition process, any other suitable process or a combination thereof, but is not limited thereto. The passivation layer 108 may protect the filter layer 106 and photodiode 104 from delamination, corrosion, or damage. Specifically, the passivation layer 108 may prevent the solution of the sample from contacting the filter layer 106 or the photodiode 104. The material of the passivation layer 108 includes metal oxides, metal nitrides, silicon oxides, silicon nitrides or a combination thereof, but is not limited thereto. In some embodiments, the metal oxides, or metal nitrides, silicon oxides, or silicon nitrides may include, but are not limited to, silicon oxide (e.g., $SiO_2$), titanium oxide (e.g., $TiO_2$), tantalum oxide (e.g., $Ta_2O_5$), aluminum oxide (e.g., $Al_2O_3$), niobium oxide (e.g., $Nb_2O_5$), silicon nitride (e.g., $Si_3N_4$), titanium nitride, tantalum nitride, or a combination thereof. In addition, the passivation layer 108 may be coated or treated with self-assembly monolayers (SAMs), functional polymers, or hydrogels for biosample immobilization. In accordance with some embodiments, the passivation material may be transparent or semi-transparent.

The modification layer 110 is disposed on the passivation layer 108. The modification layer 110 may be formed by using sputtering, spin-coating, chemical vapor deposition (CVD), low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), physical vapor deposition process, molecular beam deposition process, any other suitable process or a combination thereof, but is not limited thereto. In addition, the modification layer 110 may be coated or treated with self-assembly monolayers (SAMs), functional polymers, or hydrogels for biosample immobilization or rejection. In accordance with some embodiments, the modification material may be transparent or semi-transparent.

The material of the modification layer 110 includes metal, metal alloy, metal oxides, metal nitrides, silicon, silicon oxides, silicon nitrides, or a combination thereof, but is not limited thereto. In some embodiments, the metal, metal alloy, metal oxides, metal nitrides, silicon, silicon oxides, silicon nitrides may include, but are not limited to, silver (Ag), aluminum (Al), gold (Au), niobium (Nb), titanium (Ti), tungsten (W), an alloy thereof, silicon (e.g., Si:H), silicon oxide (e.g., $SiO_2$), titanium oxide (e.g., $TiO_2$), tantalum oxide (e.g., $Ta_2O_5$), aluminum oxide (e.g., $Al_2O_3$), niobium oxide (e.g., $Nb_2O_5$), silicon nitride (e.g., $Si_3N_4$), titanium nitride, tantalum nitride, or a combination thereof. The term "reaction well" as used herein refers to a region, a space or a structure where a biosample is placed or captured. The modification layer 110 includes a lower reaction well 120L. In some embodiments, the lower reaction well 120L may be an opening in the modification layer 110 as shown in FIG. 1. Therefore, the bottom surface of the lower reaction well 120L may be the top surface of the passivation layer 108. When the material of the modification layer 110 is different from the passivation layer 108, a selective surface coating can be performed to modify the passivation layer 108 with a functional group that may be able to capture biosamples and to modify the modification layer 110 with another functional group that may not be able to capture biosamples. Thus, the biosamples can be localized in the lower reaction well 120L.

In other embodiments, the modification layer 110 may not have an opening as the lower reaction well 120L. The lower reaction well 120L may be formed by modifying a portion of the surface of the modification layer 110 so that only a certain region can capture desired biosamples. For example, some of the functional group on the surface of the modification layer 110 may be modified to be able to capture the desired biosamples.

The cover 20 is disposed on the sensing element 10. The cover 20 essentially includes a substrate 114, an upper optical element 116A and a blocking layer 118. The material of the substrate 114 includes glass, sapphire, plastic, polymer or a combination thereof, but is not limited thereto. For example, the plastic or polymer may include, but is not limited to, bisbenzocyclobutene (BCB), polyimide (PI), polymethylmethacrylate (PMMA), cycloolefin polymer (COP), polycarbonate (PC), polydimethylsiloxane (PDMS), another suitable material, or a combination thereof.

The upper optical element 116A is disposed in the substrate 114. The upper optical element 116A is a focusing element having a parabolic surface. The concave surface of the focusing element faces the photodiode 104. The material of the focusing element includes silver (Ag), aluminum (Al), gold (Au), copper (Cu), platinum (Pt), niobium (Nb), nickel (Ni), titanium (Ti), tungsten (W), an alloy thereof, or a combination thereof, but is not limited thereto.

In some embodiments, the biosensor 100 may further include a waveguide 122 between the upper optical element 116A and the upper reaction well 120U.

The modification layer 118 is disposed on the substrate 114. To be specific, the modification layer 118 is disposed on the upper optical element 116A. The modification layer 118 includes an upper reaction well 120U. In some embodiments, the upper reaction well 120U may be an opening in the modification layer 118 as shown in FIG. 1. In other embodiments, the modification layer 118 may not have an opening as the upper reaction well 120U. Therefore, the bottom surface of the upper reaction well 120U may be the top surface of the wavelength layer 122. When the material of the modification layer 118 is different from the waveguide layer 122, a selective surface coating can be performed to modify the waveguide layer 122 with a functional group that may be able to capture biosamples and to modify the modification layer 118 with another functional group that may not be able to capture biosamples. Thus, the biosamples can be localized in the upper reaction well 120U.

The upper reaction well 120U may be formed by modifying a portion of the surface of the modification layer 118 so that only a certain region can capture desired biosamples. For example, some of the functional group on the surface of the modification layer 118 may be modified to be able to capture the desired biosamples. The upper reaction well 120U corresponds to the upper optical element 116A.

A biosample 124L is placed in the lower reaction well 120L. A biosample 124U is placed in the upper reaction well 120U. First, an excitation light 126A irradiates the biosensor 100 from the top, as shown in FIG. 1. A portion of the excitation light 126A is blocked by the upper optical elements 116A. Since there is a gap between two adjacent upper optical elements 116A, when the excitation light 126A passes the gap, the excitation light 126A will be diffracted. Therefore, the excitation light 126A can still irradiate and excite the biosample 124L. A signal from the biosample 124L is obtained by the photodiode 104.

Then, the excitation light 126A is turned off. The waveguide 122 emits an excitation light 126B. In some embodiments, the wavelength of excitation light 126B is the same as that of the excitation light 126A. The excitation light 126B irradiates and excites the biosample 124U. The emission light L of the biosample 124U is reflected by the concave surface of the upper optical element 116A, focused, and then irradiates the photodiode 104. Hence, a signal from the biosample 124U is obtained.

Therefore, since a focusing element/structure is disposed in the cover, the cover can be designed to also have reaction wells, thereby increasing the number of the reaction wells in the biosensor. As a result, the throughput of the biosensor can be significantly increased.

Figure 2:
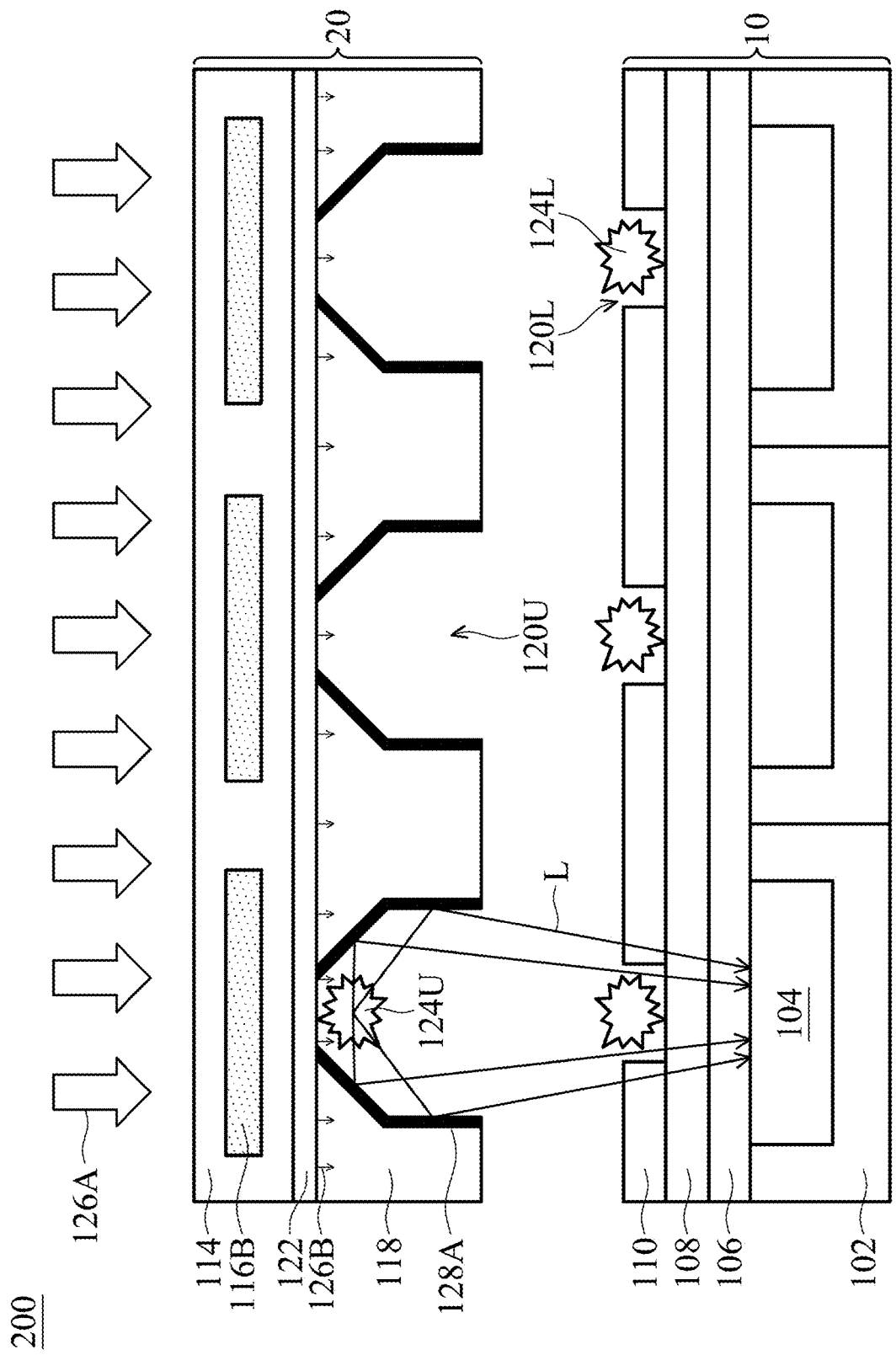
FIG. 2 illustrates a cross-sectional view of a biosensor according to some embodiments of the present disclosure.

FIG. 2 illustrates a cross-sectional view of a biosensor 200 according to some embodiments of the present disclosure. Note that the same or similar elements or layers corresponding to those of the biosensor 100 are denoted by like reference numerals. In some embodiments, the same or similar elements or layers denoted by like reference numerals have the same meaning and will not be repeated, for the sake of brevity.

One of the differences between the biosensor 200 and the biosensor 100 is that the cover 20 of the biosensor 200 includes an upper optical element 116B disposed in the substrate 114.

The upper optical element 116B is a light shielding layer to prevent the biosample 124U from being excited by the excitation light 126A. The material of the light shielding layer includes silver (Ag), aluminum (Al), gold (Au), copper (Cu), platinum (Pt), niobium (Nb), nickel (Ni), titanium (Ti), tungsten (W), an alloy thereof or a combination thereof but is not limited thereto.

The upper reaction well 120U has a bowl-like shape. The upper reaction well 120U has a sidewall. The cover 20 further includes a focusing structure 128A disposed on the sidewall. To be specific, the focusing structure 128A is conformally disposed on the sidewall of the upper reaction well 120U. The focusing structure 128A is a reflection layer. The material of the reflection layer includes silver (Ag), aluminum (Al), gold (Au), copper (Cu), platinum (Pt), niobium (Nb), nickel (Ni), titanium (Ti), tungsten (W), an alloy thereof, or a combination thereof, but is not limited thereto.

Therefore, the emission light L of the biosample 124U is reflected by the focusing structure 128A, focused, and then irradiates the photodiode 104. Hence, a signal from the biosample 124U is obtained.

Therefore, since a focusing element/structure is disposed in the cover, the cover can be designed to also have reaction wells, thereby increasing the number of the reaction wells in the biosensor. As a result, the throughput of the biosensor can be significantly increased.

Figure 3:
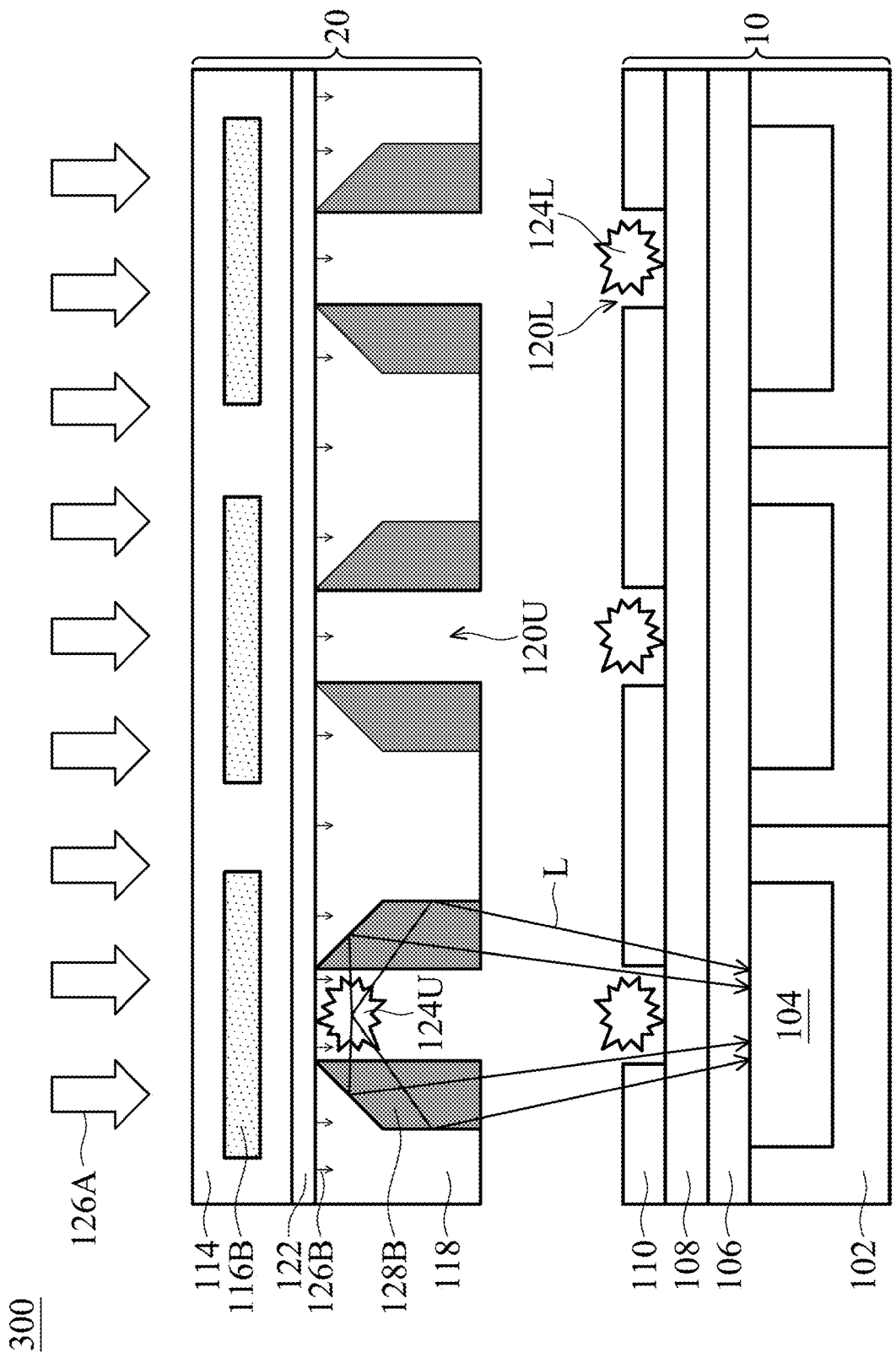
FIG. 3 illustrates a cross-sectional view of a biosensor according to some embodiments of the present disclosure.

FIG. 3 illustrates a cross-sectional view of a biosensor 300 according to some embodiments of the present disclosure. Note that the same or similar elements or layers corresponding to those of the biosensor 200 are denoted by like reference numerals. In some embodiments, the same or similar elements or layers denoted by like reference numerals have the same meaning and will not be repeated, for the sake of brevity.

One of the differences between the biosensor 300 and the biosensor 200 is that the cover 20 of the biosensor 300 includes a focusing structure 128B disposed on the sidewall of the upper reaction well 120U.

The focusing structure 128B includes a material having a higher refractive index than that of the sidewall of the upper reaction well 120U. The material includes niobium oxide ($Nb_2O_5$), tantalum oxide ($Ta_2O_5$), titanium oxide ($TiO_2$), silicon nitride ($Si_3N_4$), aluminum oxide ($Al_2O_3$), a high refractive index polymer or a combination thereof, but is not limited thereto. When the refractive index is higher than 1.5, the refractive index is considered a high refractive index.

Since the refractive index of the focusing structure 128B is higher than that of the sidewall of the upper reaction well 120U, when the emission light L of the biosample 124U enters the sidewall from the focusing structure 128B, the emission light L will be partially reflected at the interface between the focusing structure 128B and the sidewall of the modification layer 118.

Therefore, the emission light L of the biosample 124U is reflected and focused, and then it irradiates the photodiode 104. Hence, a signal from the biosample 124U is obtained.

Therefore, since a focusing element/structure is disposed in the cover, the cover can be designed to also have reaction wells, thereby increasing the number of the reaction wells in the biosensor. As a result, the throughput of the biosensor can be significantly increased.

Figure 4:
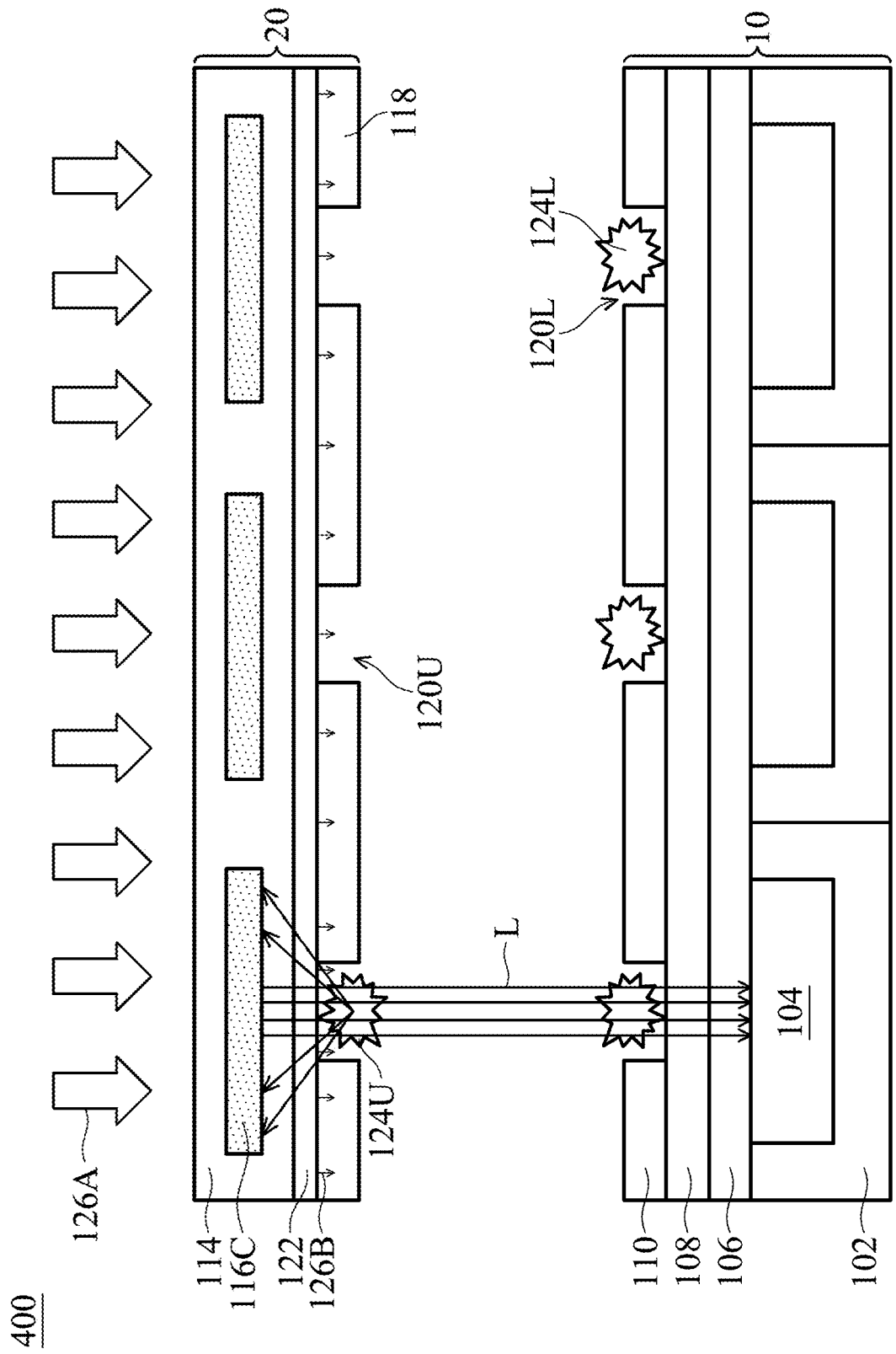
FIG. 4 illustrates a cross-sectional view of a biosensor according to some embodiments of the present disclosure.

FIG. 4 illustrates a cross-sectional view of a biosensor 400 according to some embodiments of the present disclosure. Note that the same or similar elements or layers corresponding to those of the biosensor 100 are denoted by like reference numerals. In some embodiments, the same or similar elements or layers denoted by like reference numerals have the same meaning and will not be repeated, for the sake of brevity.

One of the differences between the biosensor 400 and the biosensor 100 is that the cover 20 of the biosensor 400 includes an upper optical element 116C disposed in the substrate 114.

Figure 5:
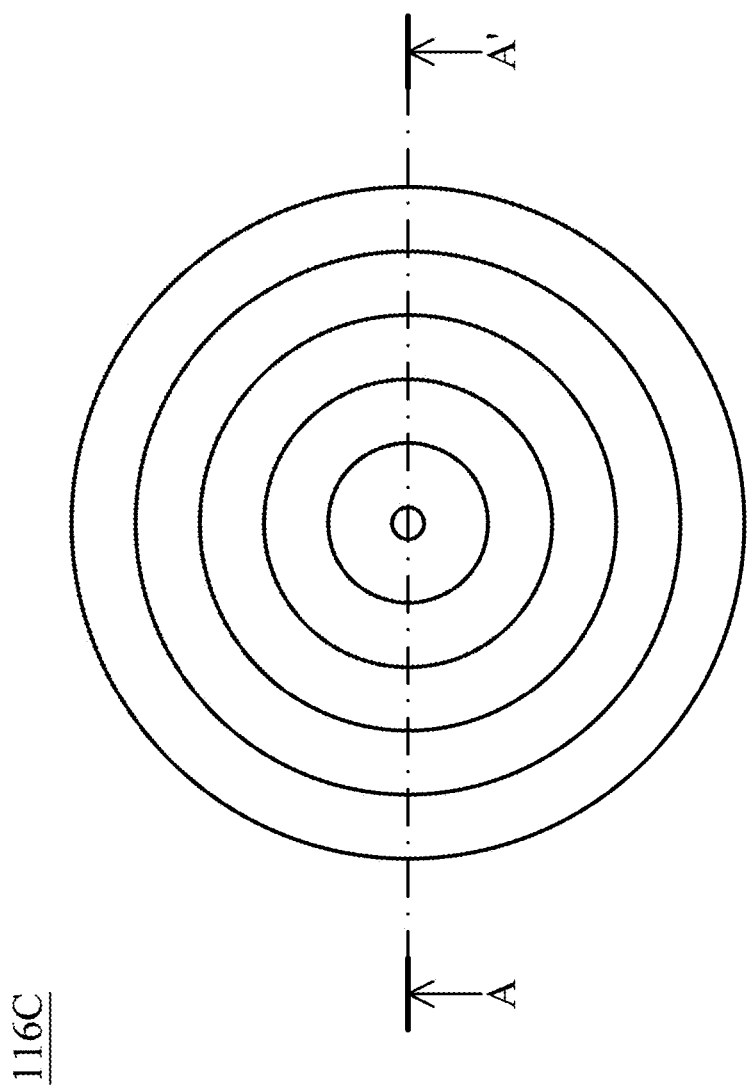
FIG. 5 illustrates a top view of the upper optical element 116C according to some embodiments of the present disclosure.

FIG. 5 illustrates a top view of the upper optical element 116C according to some embodiments of the present disclosure. As shown in FIG. 5, the upper optical element 116C is a concentric grating.

FIGS. 6A-6J illustrate various cross-sectional views of FIG. 5 along line A-A' according to some embodiments of the present disclosure.

Figure 6A:
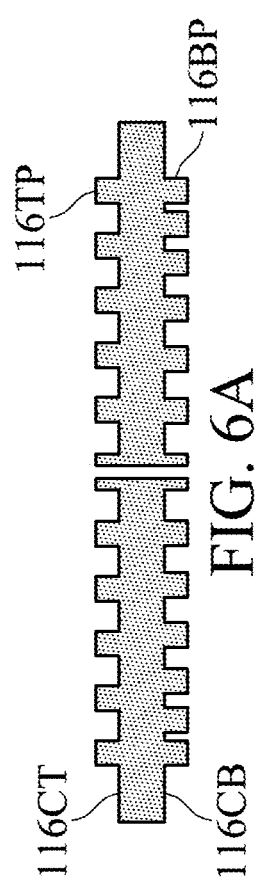
FIGS. 6A-6J illustrate various cross-sectional views of FIG. 5 along line A-A' according to some embodiments of the present disclosure.

The upper optical element 116C may include a top protrusion structure 116TP on the top surface 116CT and may include a bottom protrusion structure 116BP on the bottom surface 116CB. The upper optical element 116C may have an opening at the center. The top protrusion structure 116TP includes a plurality of protrusion parts and the bottom protrusion structure 116BP includes a plurality of protrusion parts It is assumed that light irradiates the top surface 116CT. Referring to FIG. 6A, the upper optical element 116C includes the top protrusion structure 116TP, the bottom protrusion structure 116BP and the opening. Since the upper optical element 116C includes the top protrusion structure 116TP, the light will be guided toward and concentrated at the center. Then, since the upper optical element 116C includes the opening, a portion of the light will not be reflected and will be emitted from the bottom surface 116BP.

Figure 6B:
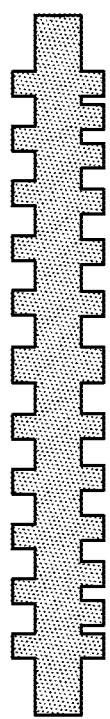
Figure 6C:
Figure 6D:
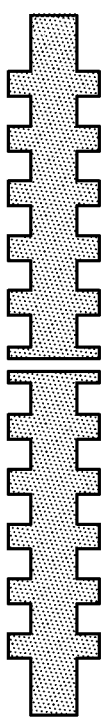
Figure 6E:
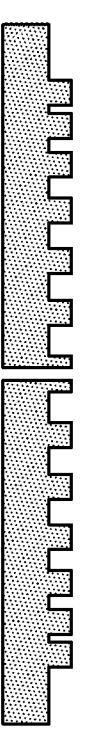
Figure 6F:
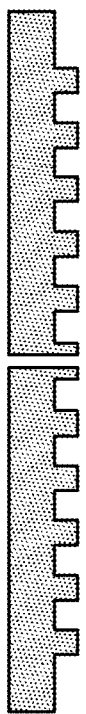
Figure 6G:
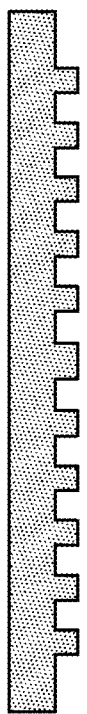
Figure 6H:
Figure 6I:
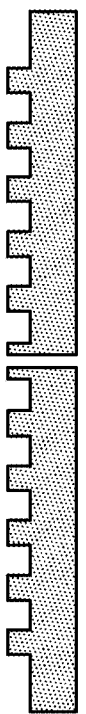
Figure 6J:
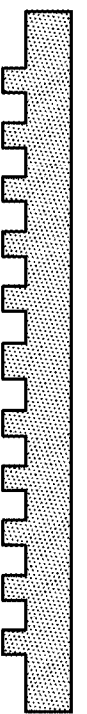

Referring back to FIG. 4, the upper optical element 116C may be similar to that of FIG. 6B, FIG. 6C or FIG. 6G. The upper optical element 116C can prevent the excitation light 126A from irradiating the biosample 124U. As a result, the emission light L from the biosample 124U can be concentrated by the upper optical element 116C and irradiate the photodiode 104. Accordingly, the photodiode 104 does not receive the emission light from the biosample 124L and the biosample 124U at the same time.

It can be appreciated that the protrusion structure can concentrate light and that the opening determines whether or not light can be emitted from the other surface. The heights, widths and the pitches of the protrusion parts determine what wavelength of light can be concentrated.

Figure 7A:
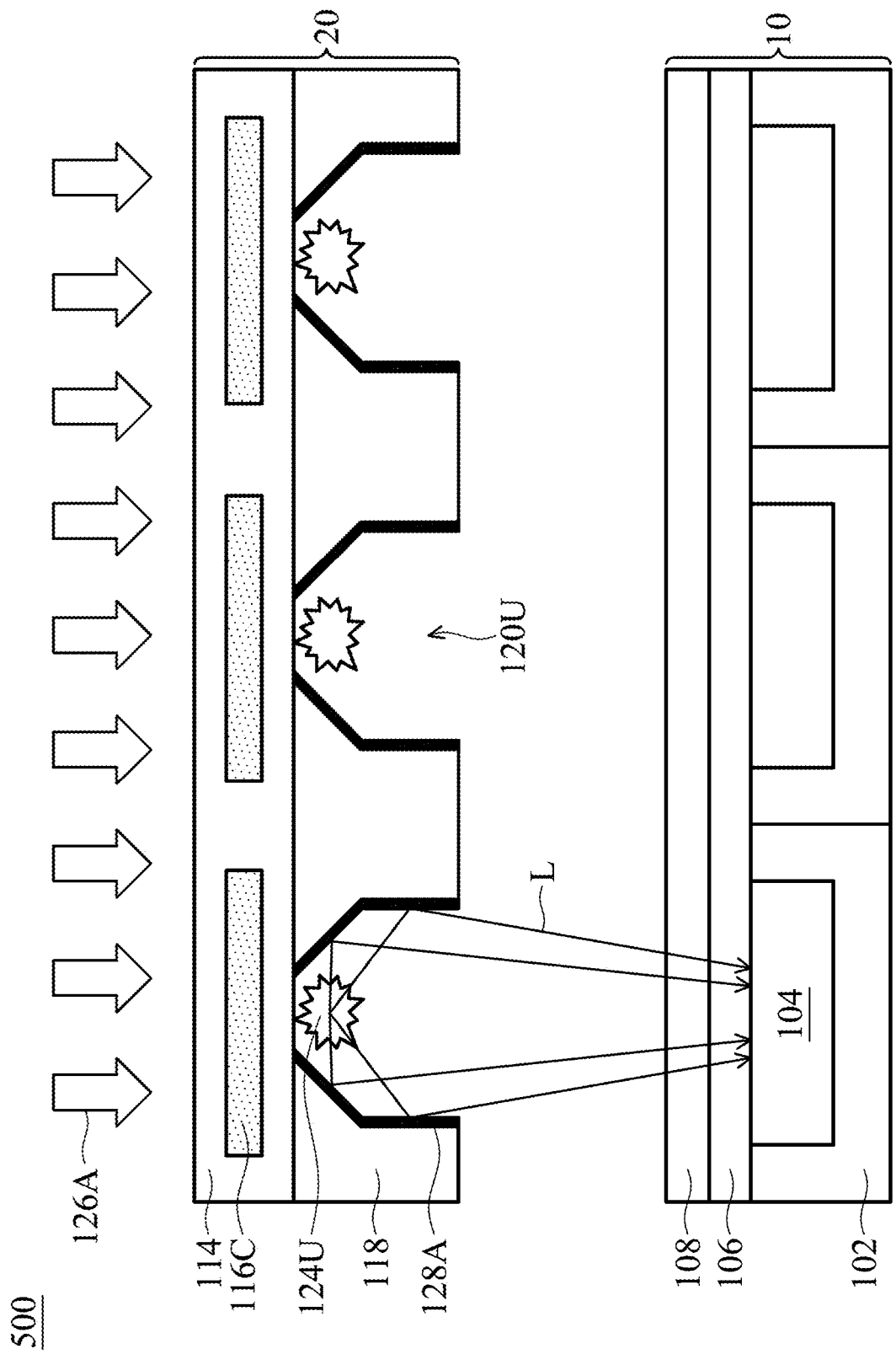
FIG. 7A illustrates a cross-sectional view of a biosensor according to some embodiments of the present disclosure.

FIG. 7A illustrates a cross-sectional view of a biosensor 500 according to some embodiments of the present disclosure. Note that the same or similar elements or layers corresponding to those of the biosensor 200 are denoted by like reference numerals. In some embodiments, the same or similar elements or layers denoted by like reference numerals have the same meaning and will not be repeated, for the sake of brevity.

One of the differences between the biosensor 500 and the biosensor 200 is that the biosensor 500 does not include the modification layer 110 and the lower reaction well 120L. The biosensor 500 includes the upper optical element 116C, which may be similar to that of FIG. 6A, 6D, 6H or 6I. The top protrusion structure 116TP of the upper optical element 116C is designed to be sensitive to the excitation light 126A, and the excitation light 126A will be guided toward and concentrated at the center. Then, since the upper optical element 116C includes the opening, a portion of the light will not be reflected and will be emitted from the bottom surface 116BP to excite the biosample 124U. Since no lower reaction well 120L is included in the biosensor 500, the waveguide 122 may not be needed. In some embodiments, the bottom protrusion structure 116BP of the upper optical element 116C can be further designed to be sensitive to the emission light L from the biosample 124U so that the emission light L can be enhanced, thus enhancing the signal intensity. The sensing element 10 can be reused without undergoing any cleaning process, such denaturing process.

Figure 7B:
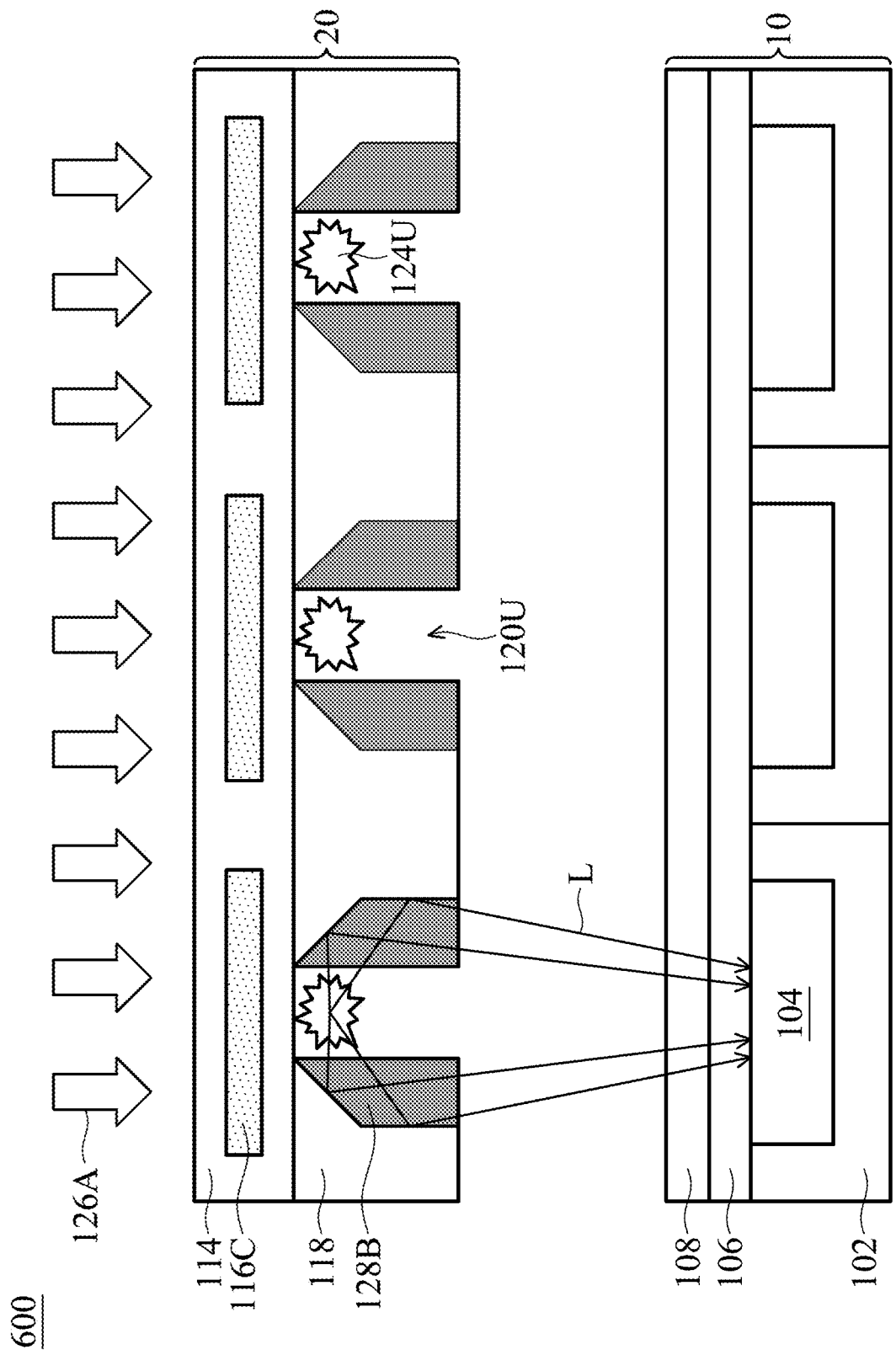
FIG. 7B illustrates a cross-sectional view of a biosensor according to some embodiments of the present disclosure.

FIG. 7B illustrates a cross-sectional view of a biosensor 600 according to some embodiments of the present disclosure. Note that the same or similar elements or layers corresponding to those of the biosensor 300 are denoted by like reference numerals. In some embodiments, the same or similar elements or layers denoted by like reference numerals have the same meaning and will not be repeated, for the sake of brevity.

One of the differences between the biosensor 600 and the biosensor 300 is that the biosensor 600 does not include the modification layer 110 and the lower reaction well 120L. The biosensor 600 includes the upper optical element 116C, which may be similar to that of FIG. 6A, 6D, 6H or 6. The top protrusion structure 116TP of the upper optical element 116C is designed to be sensitive to the excitation light 126A, and the excitation light 126A will be guided toward and concentrated at the center. Then, since the upper optical element 116C includes the opening, a portion of the light will not be reflected and will be emitted from the bottom surface 116BP to excite the biosample 124U. Since no lower reaction well 120L is included in the biosensor 600, the waveguide 122 may not be needed. In some embodiments, the bottom protrusion structure 116BP of the upper optical element 116C can be further designed to be sensitive to the emission light L from the biosample 124U so that the emission light L can be enhanced, thus enhancing the signal intensity. The sensing element can be reused without undergoing any cleaning process, such as a denaturing process.

Figure 7C:
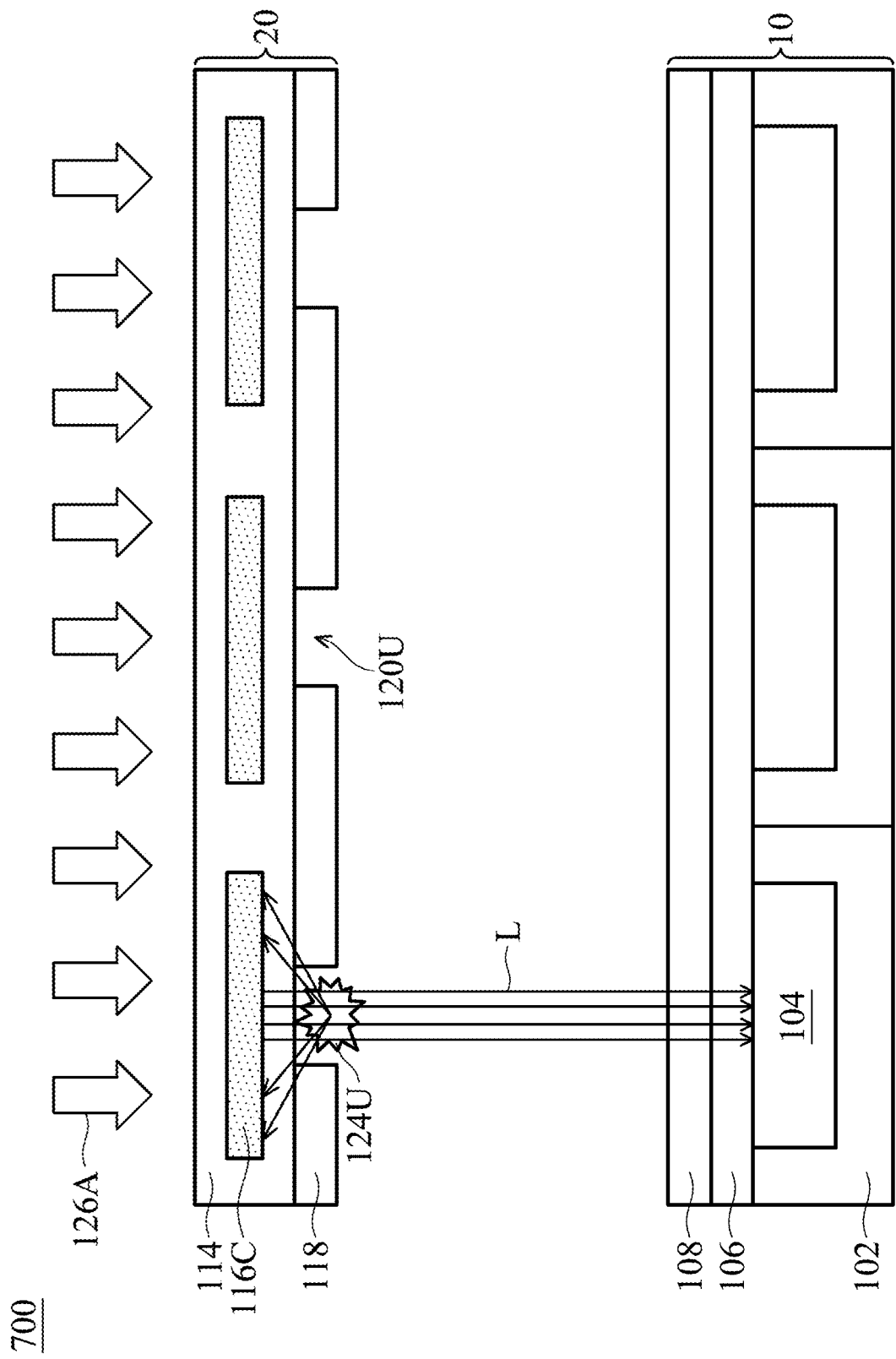
FIG. 7C illustrates a cross-sectional view of a biosensor according to some embodiments of the present disclosure.

FIG. 7C illustrates a cross-sectional view of a biosensor 700 according to some embodiments of the present disclosure. Note that the same or similar elements or layers corresponding to those of the biosensor 400 are denoted by like reference numerals. In some embodiments, the same or similar elements or layers denoted by like reference numerals have the same meaning and will not be repeated, for the sake of brevity.

One of the differences between the biosensor 700 and the biosensor 400 is that the biosensor 700 does not include the modification layer 110 and the lower reaction well 120L. The biosensor 700 includes the upper optical element 116C, which may be similar to that of FIG. 6A or 6D. The top protrusion structure 116TP of the upper optical element 116C is designed to be sensitive to the excitation light 126A, and the excitation light 126A will be guided toward and concentrated at the center. Then, since the upper optical element 116C includes the opening, a portion of the light will not be reflected and will be emitted from the bottom surface 116BP to excite the biosample 124U. Since no lower reaction well 120L is included in the biosensor 700, the waveguide 122 may not be needed. In some embodiments, the bottom protrusion structure 116BP of the upper optical element 116C can be further designed to be sensitive to the emission light L from the biosample 124U so that the emission light L can be enhanced, thus enhancing the signal intensity. The sensing element can be reused without undergoing any cleaning process, such as a denaturing process.

Figure 8A:
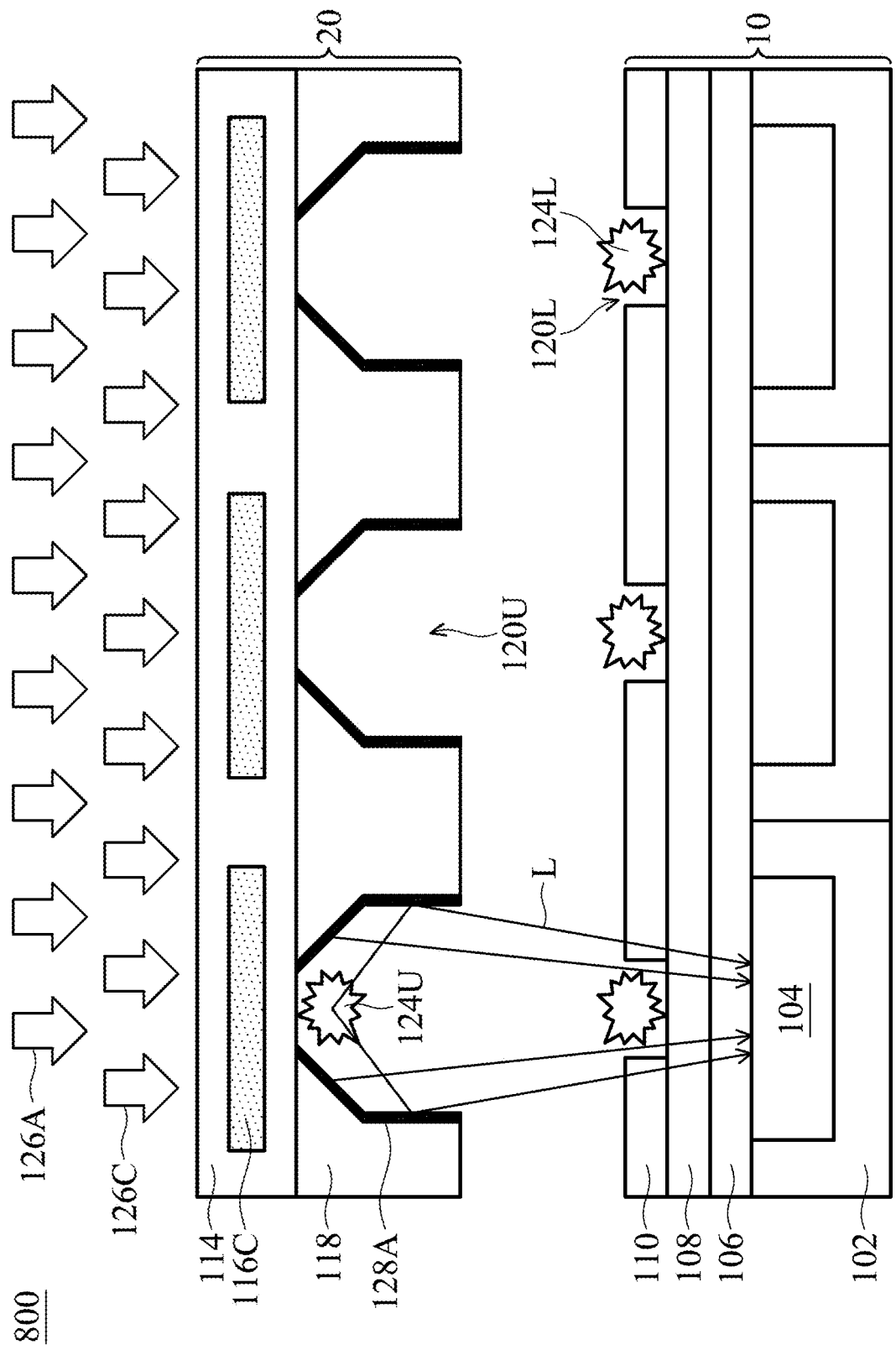
FIG. 8A illustrates a cross-sectional view of a biosensor according to some embodiments of the present disclosure.

FIG. 8A illustrates a cross-sectional view of a biosensor 800 according to some embodiments of the present disclosure. Note that the same or similar elements or layers corresponding to those of the biosensor 500 are denoted by like reference numerals. In some embodiments, the same or similar elements or layers denoted by like reference numerals have the same meaning and will not be repeated, for the sake of brevity.

One of the differences between the biosensor 800 and the biosensor 500 is that the biosensor 800 includes the modification layer 110 and the lower reaction well 120L. In some embodiments, the biosample 124U are excited by different excitation lights. For example, the biosample 124L is excited by the excitation light 126A, and the biosample 124U is excited by the excitation light 126C. The wavelength of the excitation light 126A and 126C are different.

The upper optical element 116C may be similar to that of FIG. 6A, 6D, 6H or 6I. The top protrusion structure 116TP of the upper optical element 116C is designed to be sensitive to one of the excitation lights. For example, the top protrusion structure 116TP is sensitive to the excitation light 126C. In other words, the upper optical element 116C can concentrate the excitation light 126C and allow a portion of the excitation light 126C to pass the upper optical element 116C. On the contrary, the top protrusion structure 116TP is not sensitive to the excitation light 126A. In other words, the upper optical element 116C does not concentrate the excitation light 126A. The excitation light 126A is reflected by the upper optical element 116C. In some embodiments, the bottom protrusion structure 116BP of the upper optical element 116C can be further designed to be sensitive to the emission light L from the biosample 124U so that the emission light L can be enhanced, thus enhancing the signal intensity.

As a result, even if the biosample 124L is placed in the lower reaction well 120L, the sensing element 10 can still be reused without undergoing any cleaning process, such as a denaturing process. Only the cover 20 needs to be replaced to conduct subsequent detections.

Figure 8B:
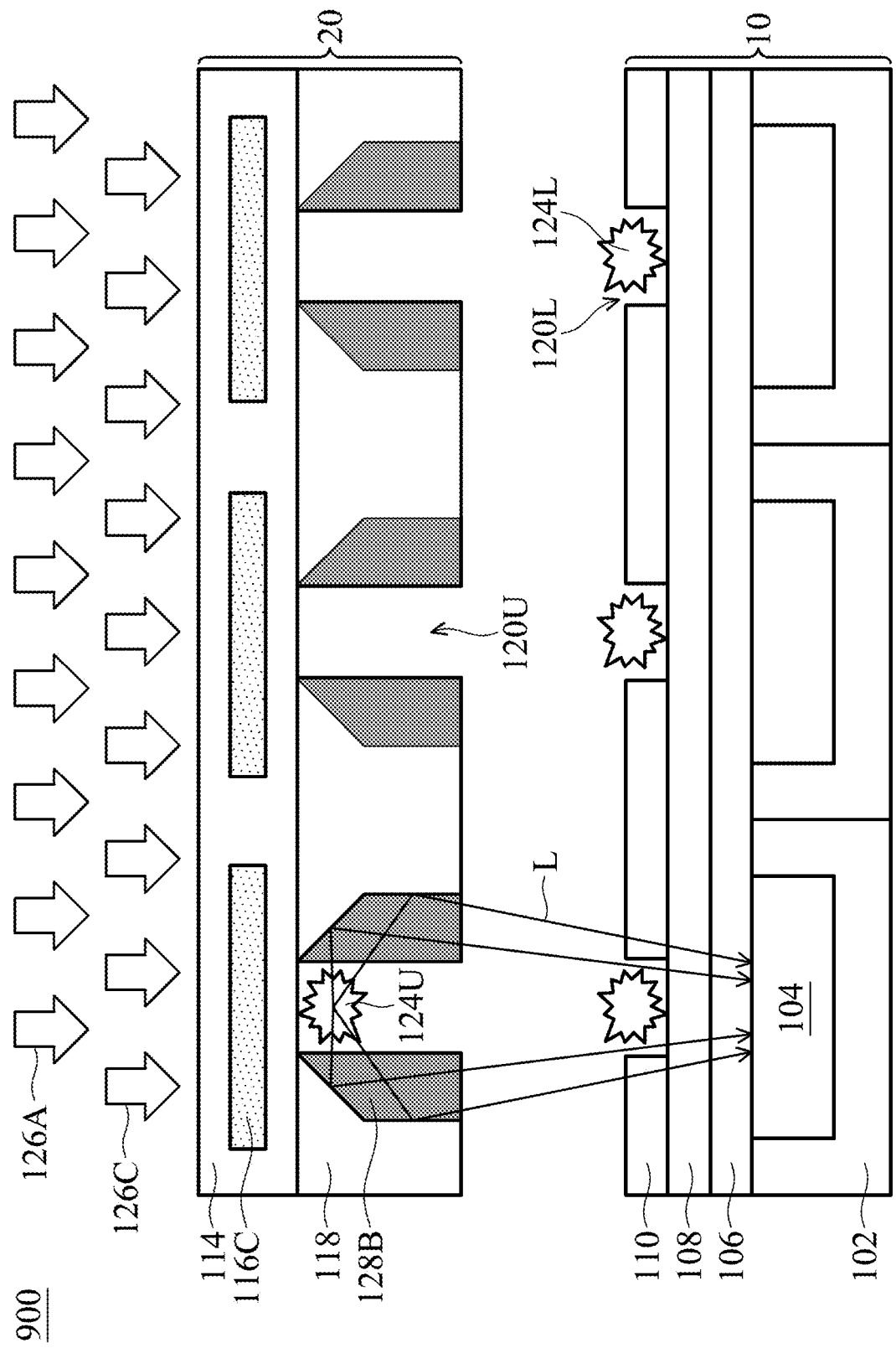
FIG. 8B illustrates a cross-sectional view of a biosensor according to some embodiments of the present disclosure.

FIG. 8B illustrates a cross-sectional view of a biosensor 900 according to some embodiments of the present disclosure. Note that the same or similar elements or layers corresponding to those of the biosensor 600 are denoted by like reference numerals. In some embodiments, the same or similar elements or layers denoted by like reference numerals have the same meaning and will not be repeated, for the sake of brevity.

One of the differences between the biosensor 900 and the biosensor 600 is that the biosensor 900 includes the modification layer 110 and the lower reaction well 120L. In some embodiments, the biosample 124L and the biosample 124U are excited by different excitation lights, respectively. For example, the biosample 124L is excited by the excitation light 126A, and the biosample 124U is excited by the excitation light 126C. The wavelength of the excitation light 126A and 126C are different.

The upper optical element 116C may be similar to that of FIG. 6A, 6D, 6H or 6I. The top protrusion structure 116TP of the upper optical element 116C is designed to be sensitive to one of the excitation lights. For example, the top protrusion structure 116TP is sensitive to the excitation 126C. In other words, the upper optical element 116C can concentrate the excitation light 126C and allow a portion of the excitation light 126C to pass the upper optical element 116C. On the contrary, the top protrusion structure 116TP is not sensitive to the excitation light 126A. In other words, the upper optical element 116C does not concentrate the excitation light 126A. The excitation light 126A is reflected by the upper optical element 116C. In some embodiments, the bottom protrusion structure 116BP of the upper optical element 116C can be further designed to be sensitive to the emission light L from the biosample 124U so that the emission light L can be enhanced, thus enhancing the signal intensity.

As a result, even if the biosample 124L is placed in the lower reaction well 120L, the sensing element 10 can still be reused without undergoing any cleaning process, such as a denaturing process. Only the cover 20 needs to be replaced to conduct subsequent detections.

Figure 8C:
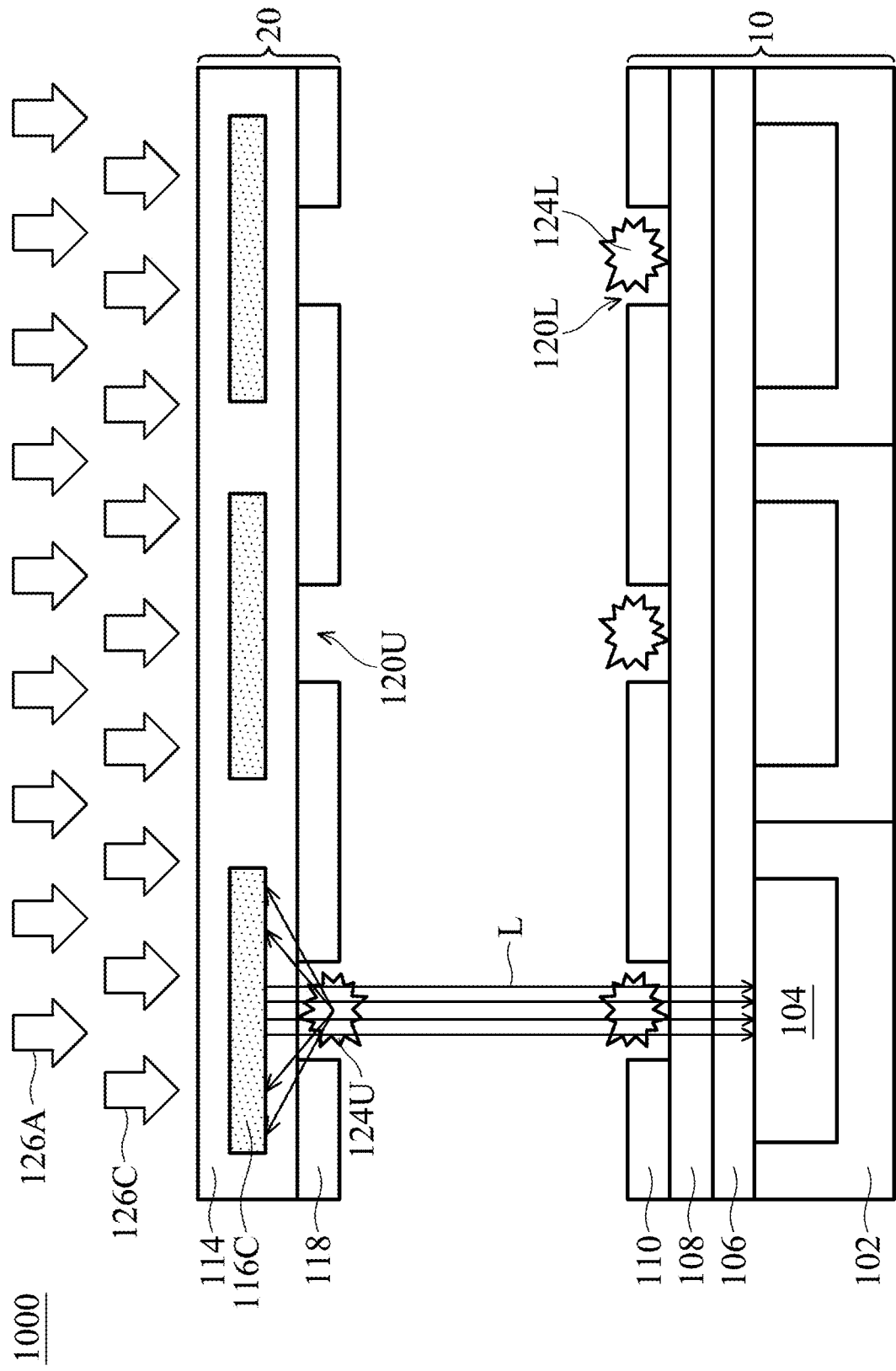
FIG. 8C illustrates a cross-sectional view of a biosensor according to some embodiments of the present disclosure.

FIG. 8C illustrates a cross-sectional view of a biosensor 1000 according to some embodiments of the present disclosure. Note that the same or similar elements or layers corresponding to those of the biosensor 700 are denoted by like reference numerals. In some embodiments, the same or similar elements or layers denoted by like reference numerals have the same meaning and will not be repeated, for the sake of brevity.

One of the differences between the biosensor 1000 and the biosensor 700 is that the biosensor 1000 includes the modification layer 110 and the lower reaction well 120L. In some embodiments, the biosample 124L and the biosample 124U are excited by different excitation lights, respectively. For example, the biosample 124L is excited by the excitation light 126A, and the biosample 124U is excited by the excitation light 126C. The wavelength of the excitation light 126A and 126C are different.

The upper optical element 116C may be similar to that of FIG. 6A or 6D. The top protrusion structure 116TP of the upper optical element 116C is designed to be sensitive to one of the excitation lights. For example, the top protrusion structure 116TP is sensitive to the excitation 126C. In other words, the upper optical element 116C can concentrate the excitation light 126C and allow a portion of the excitation light 126C to pass the upper optical element 116C. On the contrary, the top protrusion structure 116TP is not sensitive to the excitation light 126A. In other words, the upper optical element 116C does not concentrate the excitation light 126A. The excitation light 126A is reflected by the upper optical element 116C. The bottom protrusion structure 116BP of the upper optical element 116C can be further designed to be sensitive to the emission light L from the biosample 124U so that the emission light L can be enhanced, thus enhancing the signal intensity.

As a result, even if the biosample 124L is placed in the lower reaction well 120L, the sensing element 10 can still be reused without undergoing any cleaning process, such as a denaturing process. Only the cover 20 needs to be replaced to conduct subsequent detections.

Figure 9:
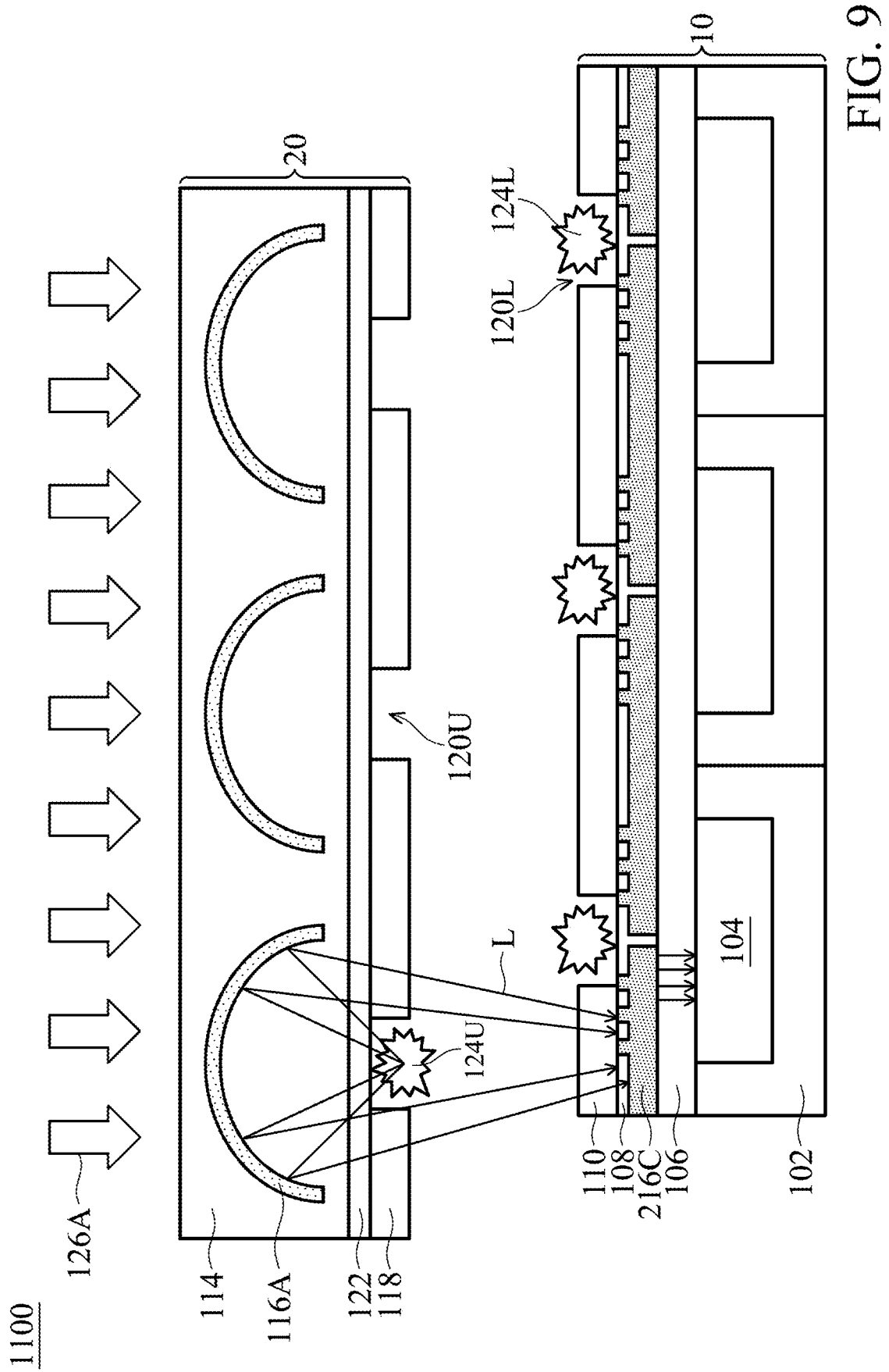
FIG. 9 illustrates a cross-sectional view of a biosensor according to some embodiments of the present disclosure.

FIG. 9 illustrates a cross-sectional view of a biosensor 1100 according to some embodiments of the present disclosure. Note that the same or similar elements or layers corresponding to those of the biosensor 100 are denoted by like reference numerals. In some embodiments, the same or similar elements or layers denoted by like reference numerals have the same meaning and will not be repeated, for the sake of brevity.

One of the differences between the biosensor 1100 and the biosensor 100 is that the biosensor 1100 includes a lower optical element 216C. As shown in FIG. 9, the lower optical element 216C is a concentric grating. The lower optical element 216 includes a top protrusion structure and an opening at the center, which may be similar to that of FIG. 6H or 6I. The top protrusion structure 116TP of the lower optical element 216C is designed to be sensitive to the emission light L from the biosample 124U and/or 124L.

Referring to FIG. 9, the cover 20 does not align to the sensing element 10. The emission light L from the biosample 124U can also be guided toward the center and emitted from the other surface. As a result, the photodiode 104 can still receive the light L from the biosample 124U.

Therefore, the failure of receiving the emission light from the biosample on the cover, which is caused by the misalignment of the cover and the sensing element, can be properly solved. In addition, the emission light from the biosample on the sensing element can also be redirected by the lower optical element to form a vertical light so that cross-talk can be reduced.

To sum up, the advantages of the biosensors provided by the embodiments of the present disclosure at least include:
(1) The throughput can be increased by disposing the focusing element or the focusing structure in the cover.
(2) Excitation light can be further blocked via the protrusion structure of the focusing element.
(3) The sensing element can be reused without undergoing any cleaning process, and does not interfere with the detection of the biosample on the cover.
(3) The failure of receiving the emission light from the biosample on the cover, which is caused by the misalignment of the cover and the sensing element, can be properly solved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and operations described in the specification. As one of ordinary skill in the art will readily appreciate from the disclosure of the present disclosure, processes, machines, manufacture, compositions of matter, means, methods, or operations, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or operations.

What is claimed is:

1. A biosensor, comprising:
a sensing element; and
a cover disposed on the sensing element,
wherein the sensing element comprises:
 a first substrate embedded with a photodiode; and
 a filter layer disposed on the substrate; and
wherein the cover comprises:
 a second substrate;
 an upper optical element disposed in the second substrate;
 a modification layer disposed on the second substrate and the upper optical element; and
 an upper reaction well disposed in the modification layer on the upper optical element,
wherein the upper optical element is an upper concentric grating having a bottom surface facing the substrate and a top surface opposite to the bottom surface.

2. The biosensor as claimed in claim 1, wherein the upper optical element is a focusing element having a parabolic surface.

3. The biosensor as claimed in claim 2, wherein a material of the upper optical element comprises silver (Ag), aluminum (Al), gold (Au), copper (Cu), platinum (Pt), niobium (Nb), nickel (Ni), titanium (Ti), tungsten (W), an alloy thereof, or a combination thereof.

4. The biosensor as claimed in claim 1, wherein the upper concentric grating comprises a top protrusion structure on the top surface.

5. The biosensor as claimed in claim 1, wherein the upper concentric grating comprises a bottom protrusion structure on the bottom surface.

6. The biosensor as claimed in claim 1, wherein the upper concentric grating comprises a top protrusion structure on the top surface and a bottom protrusion structure on the bottom surface.

7. The biosensor as claimed in claim 1, wherein the upper optical element is a light shielding layer.

8. The biosensor as claimed in claim 7, wherein a material of the light shielding layer comprises silver (Ag), aluminum (Al), gold (Au), copper (Cu), platinum (Pt), niobium (Nb), nickel (Ni), titanium (Ti), tungsten (W), an alloy thereof, or a combination thereof.

9. The biosensor as claimed in claim 1, wherein the cover further comprises a waveguide disposed between the upper optical element and the upper reaction well.

10. The biosensor as claimed in claim 1, further comprising a lower reaction well disposed on the filter layer.

11. A biosensor as claimed in claim 10, wherein the upper reaction well and the lower reaction well are disposed to correspond to each other.

12. A biosensor as claimed in claim 10, further comprising a passivation layer on the filter layer, wherein a bottom surface of the lower reaction well is a top surface of the passivation layer, a material of the modification layer is different from a material of the passivation layer, a surface coating is performed to modify the passivation layer with a functional group that is able to capture biosamples and to modify the modification layer with another functional group that is not able to capture biosamples.

13. The biosensor as claimed in claim 1, further comprising a lower optical element disposed on the filter layer.

14. The biosensor as claimed in claim 13, wherein the lower optical element is a lower concentric grating having a bottom surface facing the substrate and a top surface opposite to the bottom surface, wherein the lower optical element comprises a top protrusion structure and an opening, wherein the top protrusion structure is configured to be sensitive to an emission light from a biosample in the upper reaction well, the emission light from the biosample in the upper reaction well is guided so that the photodiode receives the emission light from the biosample in the upper reaction well.

15. The biosensor as claimed in claim 14, wherein the lower concentric grating comprises a top protrusion structure on the top surface.

16. The biosensor as claimed in claim 14, wherein the lower concentric grating comprises an opening.

17. The biosensor as claimed in claim 1, wherein the upper reaction well has a sidewall, and wherein the cover further comprises a focusing structure disposed on the sidewall of the upper reaction well.

18. The biosensor as claimed in claim 17, wherein the focusing structure comprises a material having a higher refractive index than that of the sidewall of the upper reaction well.

19. The biosensor as claimed in claim 18, wherein the material comprises niobium oxide ($Nb_2O_5$), tantalum oxide ($Ta_2O_5$), titanium oxide ($TiO_2$), silicon nitride ($Si_3N_4$), aluminum oxide ($Al_2O_3$), high refractive index polymer or a combination thereof.

20. The biosensor as claimed in claim 17, wherein the focusing structure is a reflection layer.

21. The biosensor as claimed in claim 1, further comprising a passivation layer on the filter layer.

* * * * *